Figure 1:
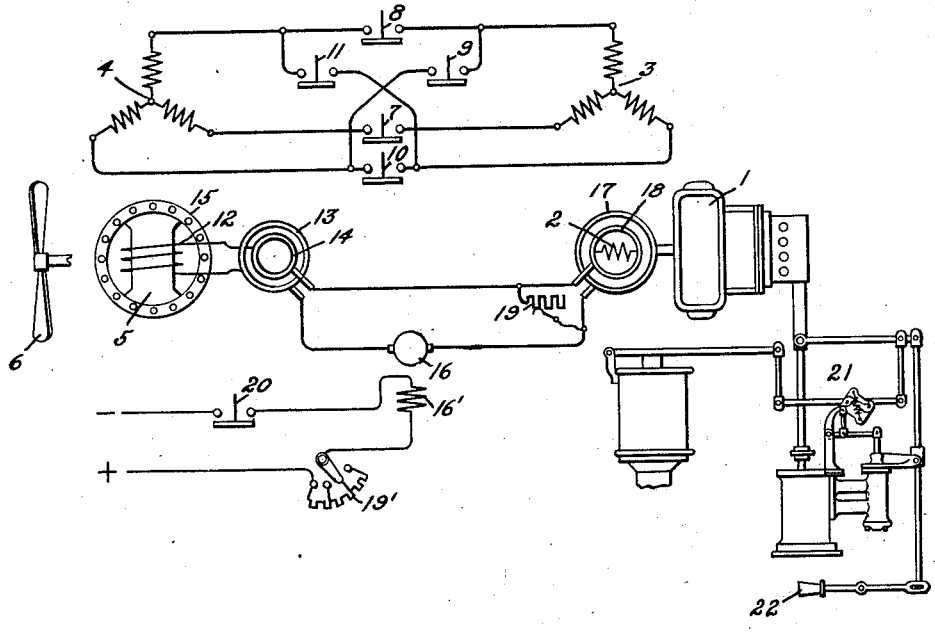

Feb. 5, 1929.

E. F. W. ALEXANDERSON 1,701,350

ELECTRIC SHIP PROPULSION

Original Filed Feb. 16, 1920   3 Sheets-Sheet 1

Fig. 1.ª

|  | 7 | 8 | 9 | 10 | 11 | 20 | 22 |
|---|---|---|---|---|---|---|---|
| FULL SPEED AHEAD | O | O |  |  | O |  | OPEN |
| OFF |  |  |  |  |  |  | CLOSED |
| TRANSFER | O |  | O |  | O |  | CLOSED |
| BRAKING | O |  | O |  | O | O | CLOSED |
| REVERSING | O |  | O |  | O | O | OPEN |
| FULL SPEED ASTERN | O |  | O |  | O | O | OPEN |

Inventor:
Ernst F. W. Alexanderson
by Albert G. Davis
His Attorney

|  | 7 | 8 | 9 | 10 | 11 | 20 | 25 | 22 |
|---|---|---|---|---|---|---|---|---|
| FULL SPEED AHEAD | o | o |  | o |  | o |  | OPEN |
| OFF |  |  |  |  |  |  |  | CLOSED |
| TRANSFER | o |  | o | o |  |  |  | CLOSED |
| BRAKING | o |  | o | o | o |  |  | CLOSED |
| PROPELLER HELD | o |  | o | o | o | o | o | CLOSED |
| REVERSING | o |  | o |  | o | o |  | OPEN |
| FULL SPEED ASTERN | o |  | o |  | o | o |  | OPEN |

Inventor:
Ernst F. W. Alexanderson
by Albert G. Davis
His Attorney

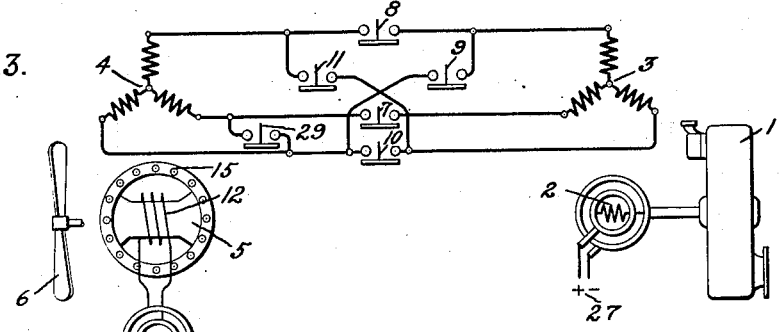
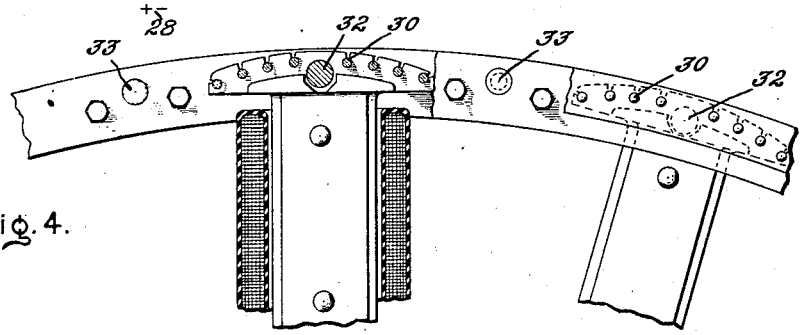
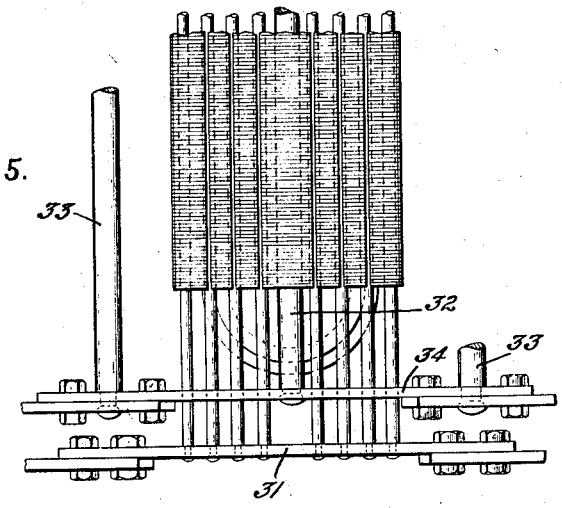

Patented Feb. 5, 1929.

1,701,350

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

ELECTRIC SHIP PROPULSION.

Original application filed February 16, 1920, Serial No. 358,973. Divided and this application filed September 12, 1921. Serial No. 500,024.

This application is a division of my application, Serial No. 358,973, filed February 16, 1920, for electric ship propulsion (Patent 1,481,882, January 29, 1924).

My invention relates to electric power systems and more particularly to systems for electric ship propulsion.

An object of my invention is to provide a system of electric propulsion which will be reliable and efficient in operation and which will extend the advantages of electric propulsion to low speed boats such as cargo boats and the like.

A further object of my invention is to provide a system of electric ship propulsion particularly adapted for use with propeller driving motors adapted to operate as synchronous motors.

A further object of my invention is to provide methods of operating electric ship propulsion equipments which shall facilitate the use of propeller driving motors of the synchronous type and which shall make it possible, with such motors, to develop, simply and reliably, the high torque necessary for maneuvering purposes.

My invention will be better understood from the following description taken in connection with the accompanying drawings, and its scope will be pointed out in the appended claims.

The requirements that must be met in electric ship propulsion equipments of general utility are unfavorable to induction motor design because of the low propeller speeds encountered. Considerations of efficiency and economy usually require a high speed turbine driven generator, and even though a bipolar generator be used, the frequency of the generator output will frequently require a propeller motor having from 60 to 80 poles. An induction motor designed to meet the conditions imposed will have a very low power factor or a dangerously small air gap, whereas the synchronous motor can be not only lighter but better in these respects. Difficulties lie in the way of using propeller driving motors of the synchronous type, however, for the reason that the synchronous motor characteristics are such that its starting and reversing torques are relatively small, even when the motor is provided with some well known form of squirrel cage winding. The requirements that a ship propulsion motor must fulfill, in order to be adapted to the characteristics of the propeller during the various maneuvering operations, have been determined experimentally. The results indicate that the momentum of the ship dragging the propeller through the water causes the propeller to be driven with considerable power by the water as a turbine, and that it cannot be stopped unless a torque nearly equal to the full load torque of the motor is exerted to break the propeller away from the water. This maximum torque occurs at a speed of about 35 per cent. After this point has been passed, the propeller can easily be stopped and can be held at standstill by braking torque of only 40 per cent of full load torque. If a quick stopping of the ship is to be effected, it is not only necessary to stop the propeller, but it must be revolved in the opposite direction. Full-load motor torque in the reversed direction is required to revolve the propeller at 33 per cent speed backwards. In order to design a motor to meet the requirements for quick maneuvering and reversal of the propeller, it is obviously necessary to have a motor, which can not only deliver a considerable driving torque to the propeller when it rotates in the reversed direction, but which also has a braking effect as high as full-load driving torque in order to stop the propeller before it can be reversed.

According to my invention I use a propeller driving motor having synchronous motor characteristics and develop the torque necessary to break the propeller from the water and bring it approximately to standstill by using the motor as an electric brake on the propeller. In order to make the propeller rotate in the opposite direction, I may proceed in a manner to take advantage of the peculiar characteristics of the combination of synchronous motor and synchronous generator which enable the motor and generator to stay together with continuity of torque characteristic from positive to negative rotation. According to this method of operation I am enabled to avoid the use of external rheostats or their equivalent in the form of high resistance windings and am enabled greatly to simplify the process of reversing the ship. Certain features of my invention, however, are not limited to such method of reversing the propeller rotation, but are of assistance in stopping and holding the propeller where the actual reversal is secured by operating the propeller motor as an induction motor.

Figures 2, 2A:
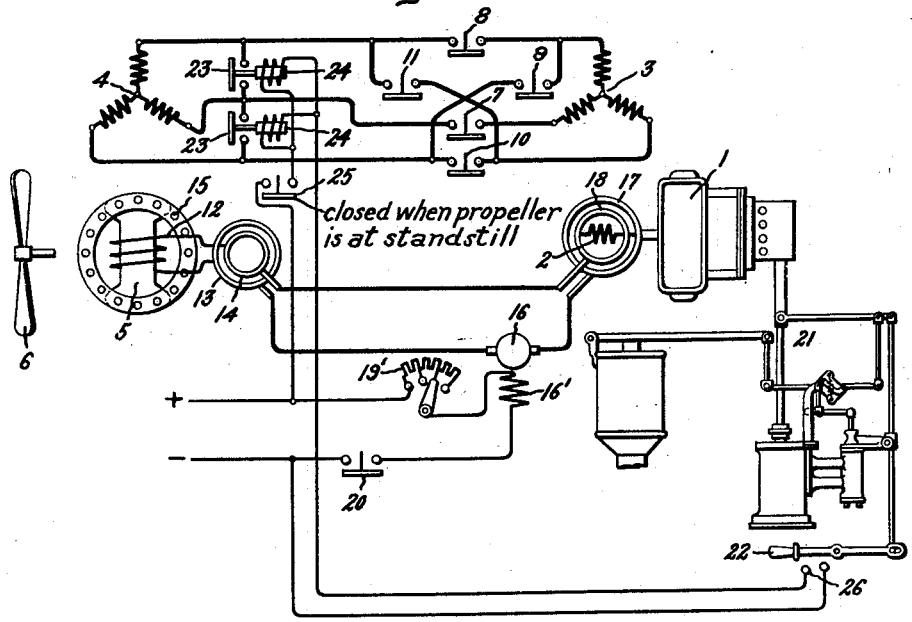

Referring to the accompanying drawings, Fig. 1 is a diagrammatic representation of a ship propulsion system comprising a turbine driven synchronous generator and a propellor driving motor of the synchronous type arranged for propeller reversal by synchronous motor action; Fig. 1ª is a sequence chart showing the preferred method of operating the system shown in Fig. 1; Fig. 2 is a diagrammatic representation of a modified form of ship propulsion system in which means are provided for holding the propeller approximately at standstill by short-circuiting connections; Fig. 2ª is a sequence chart corresponding to Fig. 2; Fig. 3 shows a modified form of ship propulsion system in which the idea of single phase braking is involved; and Figs. 4 and 5 represent a synchronous motor provided with double squirrel cage windings of a type particularly adapted for use in certain of the modifications of my invention.

Referring to Fig. 1, an elastic-fluid turbine 1 is arranged to drive directly the revolving field member 2 of a synchronous generator whose stator 3 is adapted to be connected to the stator 4 of a propeller driving motor whose rotor 5 is directly connected to the propeller 6. Circuit controlling and reversing contactors 7, 8, 9, 10 and 11 are provided in the connections between the stator windings 3 and 4. With contactors 7, 8 and 10 closed the phase rotation is such that the propeller is driven in one direction, and with contactors 7, 9 and 11 closed, the phase rotation is reversed to reverse the direction of propeller rotation. The propeller motor rotor is represented as a bipolar salient pole revolving field structure provided with an exciting winding 12 connected to slip rings 13 and 14. The rotor is provided with a squirrel cage winding 15 to enable the direction of rotation to be more readily reversed as hereinafter described. An exciter 16 is arranged to supply current in series to the exciting winding 12 of the motor and the exciting winding of the revolving field member 2 of the generator, which winding is connected to slip rings 17 and 18. An adjustable resistance 19 is shown in parallel with the field winding of the generator to indicate that the excitation current in the motor and generator field windings may be adjusted to independent values if desired. The exciter 16 is represented as provided with a field winding 16' excited from any convenient direct current source. Any suitable means for adjusting the field strength of the exciter is indicated by the adjustable resistance 19'. A switch 20 indicates a suitable means for interrupting the exciter field circuit to deenergize the field windings of the motor and generator. The turbine is represented as provided with a speed governing mechanism 21 for automatically maintaining any approximate speed which may be desired, whether the turbine is loaded or unloaded. A speed adjusting lever 22 is provided whereby the governing mechanism may be adjusted to hold any desired speed. This lever is intended to be arranged, in the modification shown in Fig. 1, to reduce the steam admission substantially to nothing when desired. The governing mechanism indicated in the drawing is of the type represented in the United States Patent to Emmet, No. 1,137,308, dated April 27, 1915. It is to be understood, however, that my invention is not limited in any respect to any particular construction or type of governing mechanism for the turbine. Whatever type of governor is selected must be designed to hold the turbine at a very low speed, but as heretofore indicated, it is immaterial as far as my invention is concerned whether a centrifugal governor, a continuous flow geared oil pump type governor, or some other type of governor is used.

The operation of the modification shown in Fig. 1 will be readily understood from a description of the methods which I have devised for stopping and reversing the propeller. If it be assumed that the ship is proceeding at full speed ahead, the contactors 7, 8 and 10 will be closed. The exciter field switch 20 will be closed and the exciter 16 will be supplying current in series to the field winding 2 and 12 of the generator and motor. Normal excitation will thus be supplied to both generator and motor. The steam lever 22 will be opened to whatever position may be necessary to hold the desired speed, which position will depend upon the navigating conditions obtaining at the time. This phase of operation is indicated in Fig. 1ª by the legend Full speed ahead. If it be now desired to reverse the ship the field circuits of the generator and motor will first be deenergized, as for example, by opening exciter switch 20, lever 22 will be moved until the steam admission to the turbine is entirely shut off. Switches 7, 8 and 10 will be opened. Switches 7, 9 and 11 will then be closed thus reversing the phase rotation between generator and motor. It will be noted that the manipulation of the line contactors 7, 8, 9, 10 and 11 is thus performed while the circuits are dead with advantages well known in the art. Exciting current is now again supplied to the field windings of the generator and motor by closing the exciter switch 20. The condition that now obtains is represented in Fig. 1ª by the legend Braking.

The rotatable element 2 of the turbine is driven by the inertia of the moving parts of the generator and turbine, and the field element 5 of the motor is driven by the propeller 6 which is being dragged through the water by the momentum of the ship. The result is, therefore, that we have two generators short circuited upon each other with reversed phase rotation. A powerful synchronous braking torque is thus exerted upon the propeller 6 to break it away from the water and bring it to standstill. The braking energy developed in the motor is dissipated largely in the solid field cores of the generator rotating field element 2 by the eddy-currents therein developed. In addition to this energy dissipation, energy is dissipated in the motor and generator windings. An additional braking torque is superposed upon the synchronous braking torque by the induction motor action of the generator upon the squirrel cage winding 15 of the motor. It is obvious that the interchange of current between the two machines produces torque reactions which rapidly slow the two machines down approximately to standstill. The two machines will get into step automatically and the operator may start the reverse operation at his leisure by moving the lever 22 to put steam on the turbine again. I thus take advantage of the peculiar characteristics of the combination of synchronous motor and synchronous generator which enable the continuity of torque characteristic to be maintained from positive to negative rotation even though the turbine be brought to standstill during the operation.

The description of operation given in connection with the maneuvering operation which involves changing from full speed ahead to full speed astern is believed to make perfectly clear how other maneuvering operations are performed. It is apparent that acceleration of the ship from standstill will be accomplished by first, manipulating the contactor switches for the desired direction of operation, after which excitation will be applied to both motor and generator and steam gradually admitted to bring the machines up to speed synchronously. Similarly, if, when the ship is drifting ahead it be desired to accelerate to full speed ahead the turbine will be brought to a speed such that the generator and motor will be in substantial synchronism before the exciter switch 20 is closed. If, on the other hand, while the ship is drifting ahead, it be desired to reverse the motion of the ship the operation of synchronous braking will precede the operation of synchronous reversal.

In the arrangement heretofore described, the steam required to be admitted while the turbine is at or near standstill may involve such temperature changes as are injurious to steam turbines as at present constructed. This objection may be eliminated to a great extent by the arrangement shown in Fig. 2. In this arrangement, the generator is arranged to be connected to supply current to the propeller driving motor as in Fig. 1, and the turbine is provided with a speed adjusting lever 22 as in Fig. 1. The arrangement differs from the arrangement shown in Fig. 1 by the provision of means for holding the motor approximately at standstill by a short circuit across its terminals which is put on after the motor is stopped. This short circuiting means comprises normally open contactors 23 arranged to be closed by coils 24 arranged to be supplied from any convenient source, represented in the drawing as the source of excitation for the exciter field winding 16'. A switch 25 is provided in the circuit leading to coils 24. Switch 25 is arranged to be closed automatically when the propeller motor is approximately at standstill. Contacts 26 are also provided in the circuit of coils 24 and these contacts are arranged to be closed when the lever 22 is in position to shut steam off from the turbine.

The operation of the modification shown in Fig. 2 in the maneuvering operation which consists in reversing the direction of the ship from full speed ahead to full speed astern is identical with the operation set forth in connection with Fig. 1 up to the point where the propeller reaches approximately standstill. At this phase of the operation switch 25 is closed, and inasmuch as the steam lever 22 is in closed position at this phase of the operation, the circuit of coils 24 is closed at contacts 26, and the contactors 23 are, therefore, closed to establish a short circuit across the motor terminals. This short circuit holds the propeller motor approximately at standstill and the operator can wait, without heating the turbine, until the ship has reached a speed at which reversal will take place as soon as he opens the steam lever. As soon as this speed has been reached, the operator will move the lever 22 to readmit steam to the turbine to effect synchronous reversal of the propeller in the manner set forth in connection with Fig. 1. The movement of the steam lever 22 at once interrupts the circuit of coils 24 to release the contactors 23, which interrupt the short circuit across the motor terminals. It will be observed that the switch 25 and contacts 26 are interlocked in such a way that the short circuit for holding the propeller approximately at standstill will be established only when the motor is approximately at standstill and the steam is off. It will also be apparent that the contactors 23 may be operated in the manner described without excessive arcing, even though the generator and motor field circuits remain closed, for the reason that the generator speed is very low when the short circuit is made and broken.

In the modifications shown in Figs. 1 and

2, I have shown the exciter connected to supply the generator and motor field windings in series, but it will be apparent that my invention is not limited to any particular arrangement of connections for the excitation circuits.

Fig. 3 shows a further modification of my invention embodying means for establishing a short circuit across the motor. The excitation circuits for the generator and motor are diagrammatically indicated at 27 and 28. It will be understood that suitable means are provided for controlling and varying the current in these excitation circuits. The generator and motor construction and the line reversing contactors are the same as in the modifications previously described. A switch 29 is arranged to establish a single phase short circuit across the terminals of the motor stator winding 4. I have found that a greater braking effect may be produced by such a single phase circuit than can be produced by a polyphase short circuit or by reversed phase braking as heretofore described. One way of explaining how this increased braking torque is developed is based upon the idea of resolving the armature reaction due to the single phase short circuit into two oppositely rotating components. The component of the armature reaction having the same rotation as the field member 5 corresponds to the polyphase generator function of the machine. The component with opposite phase rotation corresponds to the field which would be produced in this machine if it were connected to another machine with opposite phase rotation thereby creating, not only losses in the primary winding, but, also, an induction motor action upon the squirrel cage winding 15 which tends to stop the machine. It will thus be seen that the generator and motor action take place simultaneously in the same machine and three causes producing a braking torque will be present in this internal action. These causes are: 1, losses incurred by passing the current through the generator winding; 2, losses incident to passing the current through the motor winding, and 3, induction motor action of one machine upon the other.

The arrangement shown in Fig. 3 is capable of being operated in a number of different ways. Single phase braking may take place without reversed phase braking by closing the single phase short circuiting switch 29 only, as heretofore set forth. The method of operation will be to deenergize the field windings of motor and generator after which the line contactors will be opened and switch 29 closed. Single phase braking will then take place upon energization of the motor field winding 12, over excitation being preferably applied. When the propeller has been brought approximately to standstill, the line contactors may be closed for reversed operation and the switch 29 opened. If desired, however, the single phase short circuit may be opened prior to the closing of the line contactors for reversed phase rotation. Such a method of operation, however, requires either that the speed of the ship shall have been reduced to a comparatively low value or that the squirrel cage winding 15 of the motor be given especially strong reversing torque over a considerable range of slip, since, otherwise, the propeller may slip away before it can be caught and reversed by induction motor action. Where the propeller is reversed by induction motor action the generator will preferably be overexcited during the induction motor phase of operation. Under some circumstances, it may be desirable to maintain the line contactors closed for reversed phase rotation, while the switch 29 is closed for single phase braking. This method of braking will be especially advantageous where synchronous reversal is to be relied upon as in the modifications shown in Figs. 1 and 2, since the single phase short circuit may perform the function of the polyphase short circuit of Fig. 2 in holding the propeller approximately at standstill until the ship has reached a speed where synchronous reversal can take place.

Figs. 4 and 5 disclose a particular construction of squirrel cage winding for a synchronous motor of the salient pole type, which form of winding is particularly adapted for single phase synchronous braking and for securing an effective squirrel cage action for induction motor reversal. The winding comprises a high resistance component consisting of a plurality of high resistance bars 30 placed near the surface of the pole pieces. Eight of these bars are shown for each pole piece. These bars 30 are connected to short circuiting end rings 31, only one of which is shown in the drawing. The low resistance component of the winding comprises a heavy copper bar 32 arranged in the center of each pole piece and as near the surface of the pole as the high resistance bars 30 will permit. In addition to this heavy bar, there is placed a heavy copper bar 33 half way between the pole pieces, and these bars 32 and 33 are connected to short circuiting end rings 34, only one of which appears in the drawing. This low resistance squirrel cage winding has a high leakage reactance, first, because there are only a small number of bars and second, because of the position of the bars. At high values of slip, the frequency in the induction motor secondary is high and, therefore, the leakage reactance of the copper or low resistance squirrel cage winding is high and the secondary current, therefore, flows in the high resistance squirrel cage winding 30 where high losses are produced giving high induction motor torque. At low values of slip, the frequency of the secondary is low, and, therefore, the leakage reactance of the low resistance squirrel cage winding is low and the secondary current flows principally in this low resistance winding. A double squirrel cage effect is thus produced.

The winding shown in Figs. 4 and 5 is disclosed and claimed in my application, Serial No. 368,195, filed March 23, 1920 for double squirrel synchronous motors (Patent 1,495,969, May 27, 1924).

The double squirrel cage winding shown in Figs. 4 and 5 may be employed, if desired, in all of the modifications of my invention herein described.

While my invention is peculiarly adapted to utilize the advantages of a salient pole synchronous motor, it is apparent that I have disclosed features of construction and methods of operation not limited to any particular construction of synchronous motor.

I have herein shown and particularly described certain embodiments of my invention and certain methods of operation embraced therein for the purpose of explaining its principle and showing its application, but it will be obvious to those skilled in the art that many modifications and variations are possible, and I aim, therefore, to cover all such modifications and variations as fall within the scope of my invention which is defined in the appended claims.

What I claim as new and desire to secure by Letters Patent of the United States, is,—

1. The method of reversing an electric ship propulsion system comprising a synchronous motor arranged to drive a propeller, a synchronous generator, driving means for said generator and means for connecting said generator in circuit with said motor, which comprises reducing the driving torque of the driving means, rotating the motor by the propelled with the motor connected to the generator with reversed phase rotation and with excitation on both motor and generator to slow down the propeller and retard the ship, and subsequently increasing the torque of the driving means to bring the propeller up to speed in the reversed direction.

2. An electric ship propulsion system wherein a synchronous electric motor is arranged to drive a propeller, characterized by the fact that circuit control means are arranged to establish a single phase braking connection on said motor for holding it approximately at standstill against the turning effect of the water.

3. An electric ship propulsion system comprising a polyphase synchronous motor provided with a squirrel cage winding arranged to drive a propeller, a polyphase generator, means for connecting said generator to supply current to drive said motor, and means for establishing a single phase short circuit on said system for breaking the propeller from the water and bringing it approximately to a standstill.

4. An electric ship propulsion system comprising a polyphase synchronous propeller driving motor provided with a relatively high resistance low reactance winding of the squirrel cage type, and a relatively low resistance high reactance squirrel cage winding, a polyphase generator, means for connecting said generator to supply current to drive said motor, and means for establishing connections whereby said motor may be operated as a synchronous generator with one phase short circuited to break the propeller from the water and bring it approximately to standstill.

5. An electric system comprising a synchronous driving motor, means whereby connections may be established for operating said motor as a synchronous generator for braking purposes, and means to establish a low resistance short circuit braking connection for holding said motor approximately at standstill.

In witness whereof, I have hereunto set my hand this 9th day of September, 1921.

ERNST F. W. ALEXANDERSON.

CERTIFICATE OF CORRECTION.

Patent No. 1,701,350.                           Granted February 5, 1929, to

ERNST F. W. ALEXANDERSON.

It is hereby certified that error appears in the printed specification of the above numbered patent requiring correction as follows: Page 5, lines 41 and 42, claim 1, for the word "propelled" read "propeller" same page, line 66, claim 3, strike out the article "a"; and that the said Letters Patents should be read with these corrections therein that the same may conform to the record of the case in the Patent Office.

Signed and sealed this 12th day of March, A. D. 1929.

(Seal)                                                          M. J. Moore,
                                                                    Acting Commissioner of Patents.